United States Patent [19]

Yasuhara et al.

[11] Patent Number: 4,478,197
[45] Date of Patent: Oct. 23, 1984

[54] FUEL SUPPLY APPARATUS FOR A DIESEL ENGINE

[75] Inventors: Seishi Yasuhara, Yokosuka; Katsuto Yamanouchi, Yokohama, both of Japan

[73] Assignee: Nissan Motor Company, Japan

[21] Appl. No.: 428,228

[22] Filed: Sep. 29, 1982

[30] Foreign Application Priority Data

Oct. 12, 1981 [JP]  Japan .............................. 56-160933

[51] Int. Cl.³ ............................................. F02M 59/00
[52] U.S. Cl. ..................................... 123/514; 123/510
[58] Field of Search ................... 123/514, 510–513, 123/464, 458

[56] References Cited

U.S. PATENT DOCUMENTS

| 3,739,761 | 6/1973 | Niles | 123/445 |
| 3,768,730 | 10/1973 | Campbell | 165/40 |
| 4,187,813 | 2/1980 | Stumpp | 123/510 |
| 4,338,816 | 7/1982 | Neff | 73/119 A |
| 4,377,149 | 3/1983 | Naylor et al. | 123/510 |
| 4,381,748 | 5/1983 | Eckert | 123/414 |
| 4,385,867 | 5/1983 | Straubel | 123/509 |

FOREIGN PATENT DOCUMENTS

| 0050032 | 4/1982 | European Pat. Off. | 123/510 |
| 2386692 | 11/1978 | France . | |
| 2456223 | 12/1980 | France | 123/514 |
| 2490733 | 3/1982 | France . | |
| 55-46010 | 3/1980 | Japan | 123/510 |
| 2031994 | 4/1980 | United Kingdom | 123/511 |
| 1575643 | 9/1980 | United Kingdom | 123/514 |
| 2053354 | 2/1981 | United Kingdom . | |

Primary Examiner—Magdalen Y. C. Moy
Attorney, Agent, or Firm—Lowe, King, Price & Becker

[57] ABSTRACT

A fuel supply apparatus for a diesel engine includes a fuel tank and a fuel injection pump. The fuel injection pump has an inlet and an overflow outlet. A fuel feed line connects the fuel tank to the inlet of the fuel injection pump. A fuel feed pump is disposed in the fuel feed line to supply fuel from the fuel tank to the fuel injection pump. A fuel filter is disposed along the fuel feed line. A main fuel return line connects the overflow outlet of the fuel injection pump to the fuel tank. An auxiliary fuel return line connects the overflow outlet of the fuel injection pump to the fuel feed line at a position upstream of the fuel filter. A control valve is disposed in the auxiliary fuel return line to selectively block the latter. A device drives the control valve in response to the temperature of fuel in the fuel filter so that the control valve will block the auxiliary fuel return line only when the temperature of fuel in the fuel filter is higher than a preset value.

7 Claims, 9 Drawing Figures

FUEL SUPPLY APPARATUS FOR A DIESEL ENGINE

BACKGROUND OF THE INVENTION

1. Field of the Invention

This invention relates to a fuel supply apparatus for a diesel engine having a fuel injection pump.

2. Description of the Prior Art

Fuel injection pumps are used with diesel engines to feed and deliver fuel to engine combustion chambers. Fuel is supplied from fuel tanks to the injection pumps by way of fuel filters. A considerable amount of fuel is circulated through the injection pumps, the fuel tanks, and the fuel filters to prevent overheating of the injection pumps and to bleed entrained bubbles and air out of the injection pumps.

In the case of an automotive diesel engine, the fuel tank is essentially exposed to the atmosphere, and a fuel feed pipe connecting the fuel tank and the fuel filter is similarly external to the body of automotive vehicle. As a result, the fuel tank and the fuel feed pipe are sensitive to atmosphere temperature. When atmospheric temperature is extremely low, wax may form in the fuel entering the fuel filter. The wax can block the fuel filter, causing insufficient fuel supply to the injection pump.

SUMMARY OF THE INVENTION

It is an object of this invention to provide a fuel supply apparatus for a fuel-injection-pump equipped diesel engine which prevents interruption of fuel supply to the fuel injection pump even when the ambient temperature is extremely low.

In accordance with this invention, a fuel supply apparatus for a diesel engine includes a fuel tank and a fuel injection pump. The fuel injection pump has an inlet and an overflow outlet. A fuel feed line connects the fuel tank to the inlet of the fuel injection pump. A fuel feed pump is disposed in the fuel feed line to supply fuel from the fuel tank to the fuel injection pump. A fuel filter is disposed in the fuel feed line. A main fuel return line connects the overflow outlet of the fuel injection pump to the fuel tank. An auxiliary fuel return line connects the overflow outlet of the fuel injection pump to the fuel feed line at a position upstream of the fuel filter. A control valve is disposed in the auxiliary fuel return line to selectively block the latter. A device drives the control valve in response to temperature of fuel in the fuel filter so that the control valve will block the auxiliary fuel return line only when the temperature of fuel in the fuel filter is higher than a preset value.

The above and other objects, features and advantages of this invention will be apparent from the following description of preferred embodiments thereof, taken in conjunction with the drawings.

BRIEF DESCRIPTION OF THE DRAWINGS

Like reference characters designate like parts throughout the drawings.

DESCRIPTION OF THE PREFERRED EMBODIMENTS

Figure 1:
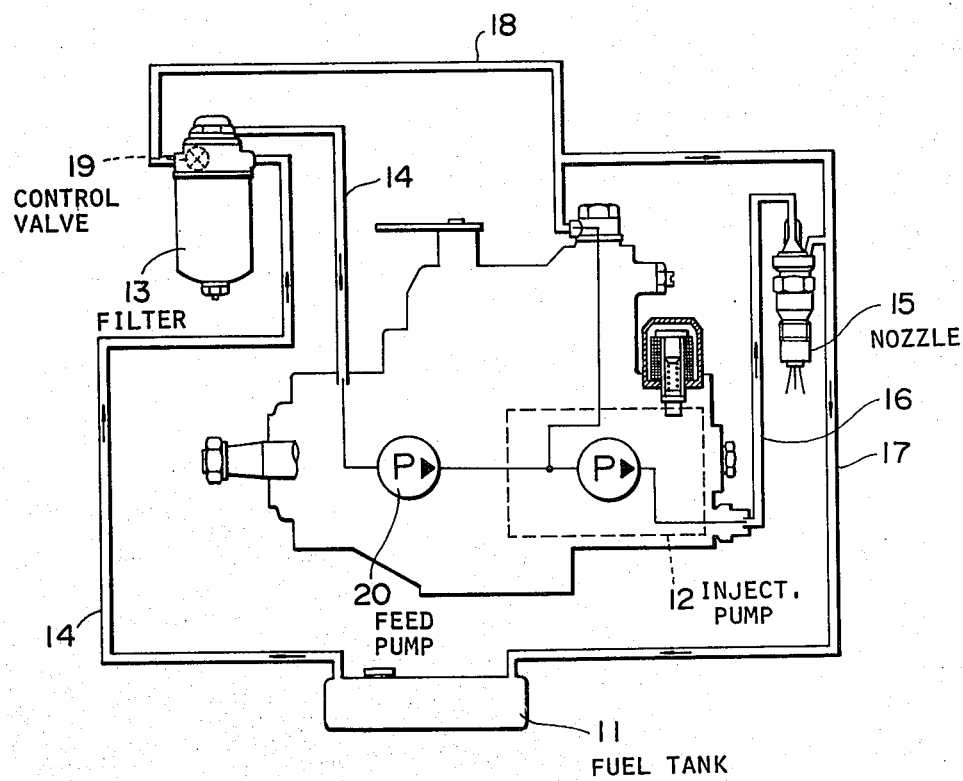
FIG. 1 is a diagrammatic view of a fuel supply apparatus according to a first embodiment of this invention.

With reference to FIG. 1, there is shown a fuel supply apparatus for a diesel engine according to a first embodiment of this invention. The apparatus has a fuel tank 11, a fuel feed pump 20, and a fuel injection pump 12. The pumps 12 and 20 are driven by the engine and are disposed in a common housing. The injection pump 12 is substantially similar to that, for example, disclosed in U.S. Pat. No. 3,630,643. A fuel feed line 14 connects the tank 11 to the inlet of the injection pump 12. The feed pump 20 is disposed in the feed line 14 to draw fuel from the tank 11 and supply it to the injection pump 12. A fuel filter 13 is disposed in the feed line 14 upstream of the feed pump 20 to remove dirt and other contaminants from fuel drawn into the feed pump 20. A fuel delivery line 16 connects the outlet of the injection pump 12 to the inlet of a fuel injection nozzle 15 to supply fuel from the injection pump 12 to the injection nozzle 15. The injection nozzle 15 discharges fuel into the combustion chamber of a diesel engine.

The injection pump 12 has a fuel overflow or circulation outlet connected to the inlet thereof. The injection nozzle 15 has a fuel return outlet. A main fuel return line 17 connects the tank 11 to the overflow outlet of the injection pump 12 and the return outlet of the injection nozzle 15. A considerable amount of fuel is normally circulated by the feed pump 20 through the inlet and overflow outlet of the injection pump 12, the main return line 17, the tank 11, the feed line 14, and the fuel filter 13, so as to cool the injection pump 12 and to expel bubbles and air from the injection pump 12. A portion of fuel supplied to the injection nozzle 15 is normally returned to the tank 11 through the main return line 17.

One end of an auxiliary fuel return line 18 is connected to the overflow outlet of the injection pump 12 or the main return line 17, and the other end thereof is connected to the feed line 14 immediately upstream of the filter 13, that is, to the inlet of the filter 13. A control valve 19 is disposed in the auxiliary return line 18 to selectably block the auxiliary return line 18. When the control valve 19 blocks the auxiliary return line 18, fuel from the injection pump 12 returns to the tank 11 through the main return line 17 as the aforementioned normal condition. When the control valve 19 opens the auxiliary return line 18, fuel from the overflow outlet of the injection pump 12 is drawn into the inlet thereof via the auxiliary return line 18, the control valve 19, the filter 13, the feed line 14 and the feed pump 20, bypassing the tank 11. This circulation of fuel through the auxiliary return line 18 is also effected by the feed pump 20.

Figure 2:
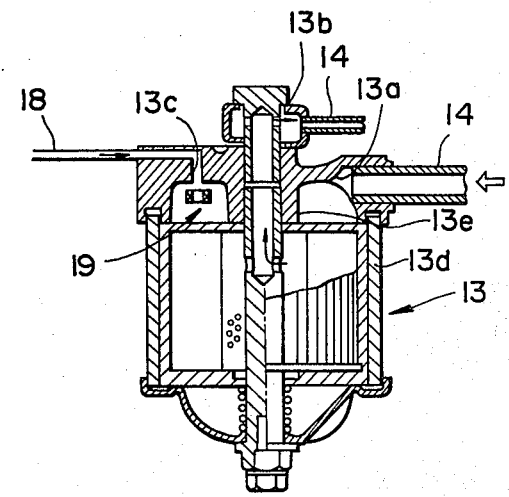
FIG. 2 is a longitudinal-section view of the fuel filter including the control valve of FIG. 1.

As shown in FIG. 2, the control valve 19 is incorporated in the filter 13. The filter 13 has a housing 13d formed with first and second inlets 13a and 13c, an outlet 13b, and a chamber 13e. The first inlet 13a is connected to the end of a pipe forming the feed line 14, and opens to the chamber 13e. The second inlet 13c is connected to the auxiliary return line 18, and opens to the chamber 13e. The outlet 13b is connected to the end of another pipe forming the feed line 14, and communicates with the chamber 13e via internal passages (not designated). A filtering element (not designated) is arranged in the chamber 13e in such a manner that fuel will pass through the filtering element as it flows from the inlets 13a and 13c to the outlet 13b. The control valve 19 is disposed in the chamber 13e and is designed so as to selectively block the second inlet 13c in response to the temperature of fuel in the chamber 13e. The control valve 19 opens the second inlet 13c and thus the auxiliary return line 18 when fuel temperature is equal to or lower than a preset value, for example, 10° C. and blocks the second inlet 13c when fuel temperature is higher than the preset value.

The overall operation of the apparatus will be described hereafter. Assume that fuel temperature at the control valve 19, that is, temperature of fuel in the filter 13, is equal to or lower than the preset value and thus the auxiliary return line 18 is opened in the initial condition.

When the engine starts, the feed pump 20 comes into operation and draws fuel from the filter 13 through the outlet 13b and the feed line 14. Simultaneously, fuel flows from the tank 11 into the filter 13 through the feed line 14 and the first inlet 13a, and also through the main return line 17, the auxiliary return line 18, and the second inlet 13c. The feed pump 20 forces fuel to flow through the injection pump 12 via the inlet and the overflow outlet thereof. Almost all of the fuel from the overflow outlet of the injection pump 12 is transmitted into the filter 13 through the auxiliary return line 18.

Starting the engine also causes the injection pump 12 to come into operation. Thus, the injection pump 12 supplies fuel to the injection nozzle 15 through the delivery line 16. The injection nozzle 15 discharges part of the fuel into the engine combustion chamber and the rest of the fuel into the main return line 17. When the control valve 19 opens the auxiliary return line 18, the rate of fuel flow from the injection nozzle 15 to the engine combustion chamber is substantially equal to that of fuel exiting from the tank 11.

Temperature of overflow fuel, that is, fuel from the overflow outlet of the injection pump 12, gradually rises after the engine is started, so that temperature of the filter 13 also rises. The rise in temperature of overflow fuel results from the fact that fuel is heated while passing through the injection pump 12 and the feed pump 20 in operation. If there is congealed or hardened wax in the fuel within the filter 13, the rise in temperature of the filter 13 will cause the wax to dissolve in the fuel and thus exit from the filter 13. In this way, blockage of the filter 13 by hardened wax will be prevented even when atmospheric temperature is extremely low.

When fuel temperature at the control valve 19, that is, the temperature of fuel in the filter 13, exceeds the preset value, the control valve 19 blocks the second inlet 13c and thus the auxiliary return line 18. The blockage of the auxiliary return line 18 causes all of the fuel from the overflow outlet of the injection pump 12 to return to the tank 11 through the main return line 17. In this case, fuel is supplied by the feed pump 20 from the tank 11 into the injection pump 12 through the feed line 14 and the filter 13 as a normal condition. The return of overflow fuel to the tank 11 causes temperature of the tank 11 to rise.

When fuel temperature at the control valve 19 drops below the preset value, the control valve 19 opens the second inlet 13c and thus the auxiliary return line 18. Overflow fuel is therefore transmitted to the filter 13 via the auxiliary return line 18 as in the previously described case.

Figure 3:
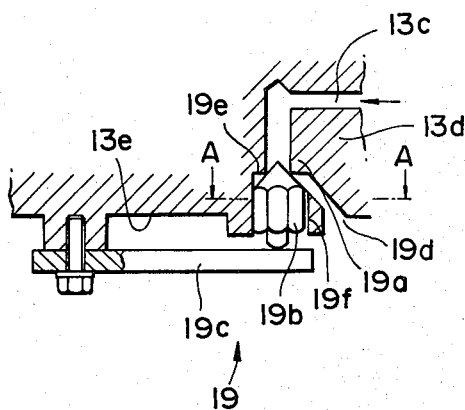
FIG. 3 is an enlarged sectional view of the control valve of FIG. 2.
Figure 4:
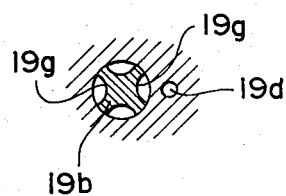
FIG. 4 is a cross-sectional view of the control valve taken along line A—A of FIG. 3.

FIGS. 3 and 4 show details of the control valve 19, which has a valve seat 19a, a valve body 19b, and a temperature-responsive device 19c. The second inlet 13c has an annular step 19e near the chamber 13e to form an enlarged-diameter portion 19f at the end. The valve body 19b is slideably disposed in the enlarged-diameter portion 19f. The valve body 19b has a conical end coaxially opposing the step 19e. The conical surface of the valve body 19b can contact the inner circumferential edge of the step 19e constituting the valve seat 19a. The periphery of the valve body 19b has a plurality of longitudinally extending grooves 19g. When the valve body 19b seats on the valve seat 19a, the second inlet 13c is blocked. When the valve body 19b unseats from the valve seat 19a, the second inlet 13c is opened through the grooves 19g and the gap between the valve seat 19a and the valve body 19b.

The temperature-responsive device 19c consists of a bimetallic strip, which is disposed in the chamber 13e to be exposed to fuel in the chamber 13e. One end of the bimetal 19c is bolted to the housing 13d. The free end of the bimetal 19c engages the end of the valve body 19b facing the chamber 13e. When temperature of the bimetal 19c, i.e., that of fuel in the chamber 13e, is higher than a preset value, the bimetal 19c forces the valve body 19b to seat on the valve seat 19a. When temperature of the bimetal 19c is equal to or lower than the preset value, the bimetal 19c permits the valve body 19b to unseat from the valve seat 19a.

A passage 19d is provided in the housing 13d. One end of the passage 19d opens to the second inlet 13c downstream of the valve seat 19a, the other end thereof opens to the chamber 13e distant from the bimetal 19c. When the valve body 19b unseats from the valve seat 19a, the passage 19d permits overflow fuel to flow therethrough and thus reduces the amount of overflow fuel directly pouring onto the bimetal 19c through the grooves 19g, preventing the bimetal 19c from being thermally isolated or only locally heated. The end of the passage 19d opening to the chamber 13e preferably faces away from the bimetal 19c.

The temperature-responsive device 19c may be a bellows containing a liquid that evaporates with increasing temperature so that the internal pressure causes the bellows to expand. The temperature-responsive device 19c also may be a wax-containing member deforming in response to fuel temperature.

Figure 5:
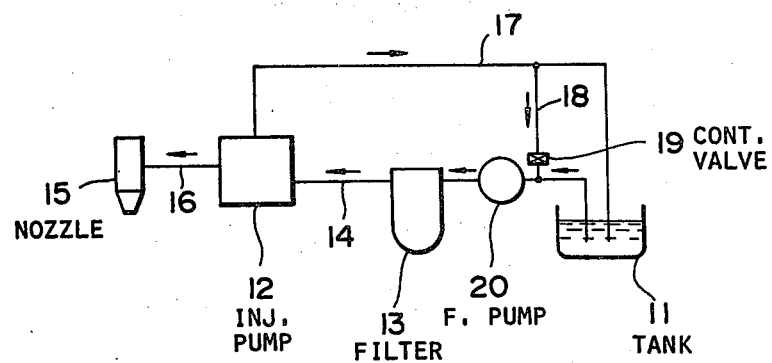
FIG. 5 is a diagram of a fuel supply apparatus according to a second embodiment of this invention.

FIG. 5 shows a fuel supply apparatus according to a second embodiment of this invention. This apparatus is designed in a manner similar to that of the first embodiment except for the following points:

A feed pump 20 is housed separately from the injection pump 12, and transmits fuel from the tank 11 to the injection pump 12 through the feed line 14. The filter 13 is disposed in the feed line 14 between the pumps 12 and 20. The auxiliary return line 18 connects with the feed line 14 upstream of the feed pump 20. The control valve 19 is provided separately from the filter 13 and is disposed in the auxiliary return line 18 to selectively block the latter. The design of the control valve 19 is similar to that of the control valve of FIGS. 3 and 4, and thus the control valve 19 opens and closes in response to fuel temperature, that is, temperature of fuel being supplied to the feed pump 20. The feed pump 20 circulates fuel through the injection pump 12, the main return line 17, the auxiliary return line 18, the control valve 19, the feed line 14, and the filter 13 when the control valve 19 opens the auxiliary return line 18, and circulates fuel through the injection pump 12, the main return line 17, the tank 11, the feed line 14, and the filter 13 when the control valve 19 closes the auxiliary return line 18.

Figure 6:
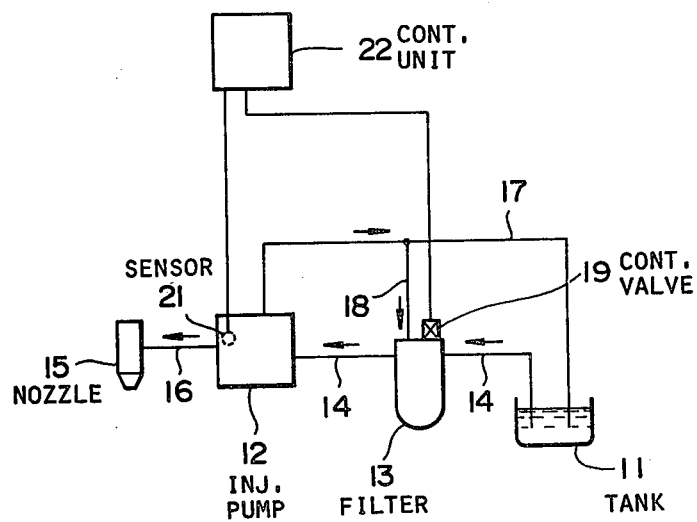
FIG. 6 is a diagram of a fuel supply apparatus according to a third embodiment of this invention.

FIG. 6 shows a fuel supply apparatus according to a third embodiment of this invention. This apparatus is applied to a diesel engine having a microcomputer-equipped control unit or electronic control unit 22, and is designed in a manner similar to that of the first embodiment except for the following points:

The control valve 19 is of the electrically-driven type and is disposed in the auxiliary return line 18 to selectively block the latter. A temperature sensor 21 is disposed in the injection pump 12 to sense the temperature of fuel in the injection pump 12. The control unit 22 drives the control valve 19 in response to the output signal of the sensor 21 indicative of temperature of fuel in the injection pump 12.

Figure 7:
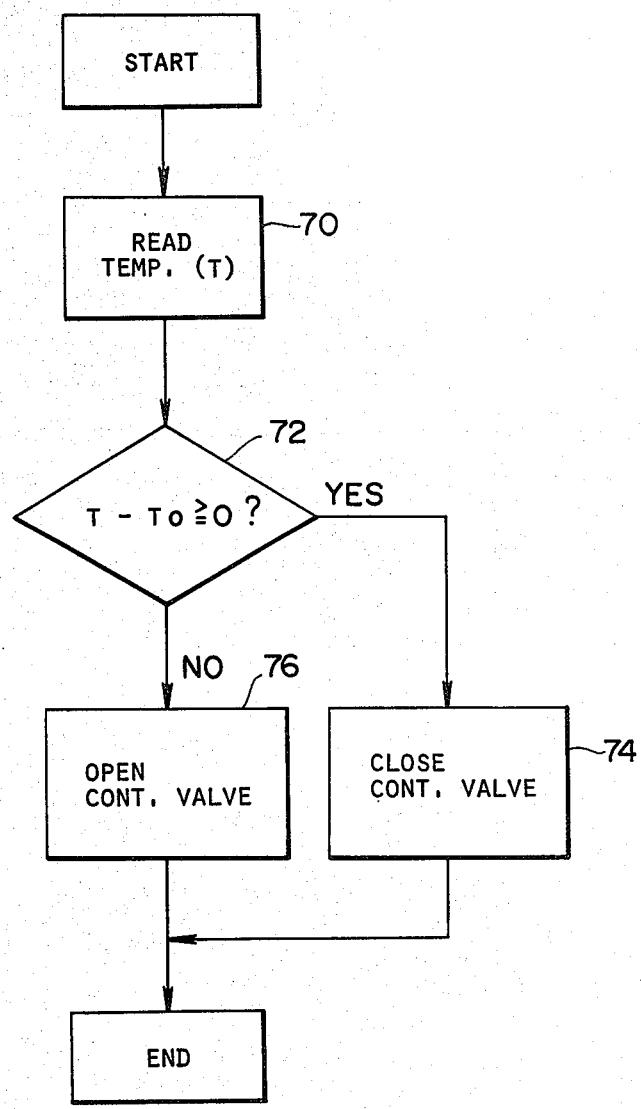
FIG. 7 is a flowchart of the operation of the control unit of FIG. 6.

The operation of the control unit 22 is defined by a program stored therein, and is now explained with reference to the flowchart of FIG. 7. First, the control system 22 reads temperature of fuel from the output signal of the sensor 21 in a step 70. Second, the control unit 22 decides whether or not the temperature of fuel is equal to or higher than a preset value $T_o$ in a step 72. When the temperature of fuel is equal to or higher than the preset value $T_o$, the control unit 22 supplies the control valve 19 with a control signal to drive the control valve 19 to block the auxiliary return line 18 in a step 74. When the temperature of fuel is lower than the preset value $T_o$, the control unit 22 supplies the control valve 19 with a control signal to drive the control valve 19 to open the auxiliary line 18 in a step 76. In this third embodiment, the temperature of fuel in the filter 13 is deduced from that of fuel in the injection pump 12.

Figure 8:
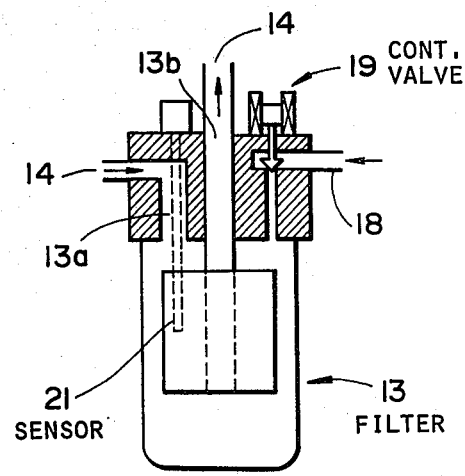
FIG. 8 is a longitudinal-section view of a filter according to a fourth embodiment of this invention.

FIG. 8 shows an essential portion of a fuel supply apparatus according to a fourth embodiment of this invention. This apparatus is designed in a manner similar to that of the third embodiment except for the following point:

The temperature sensor 21 is disposed in the filter 13 instead of the injection pump 12 (see FIG. 6). The sensor 21 directly senses the temperature of fuel in the filter 13.

Figure 9:
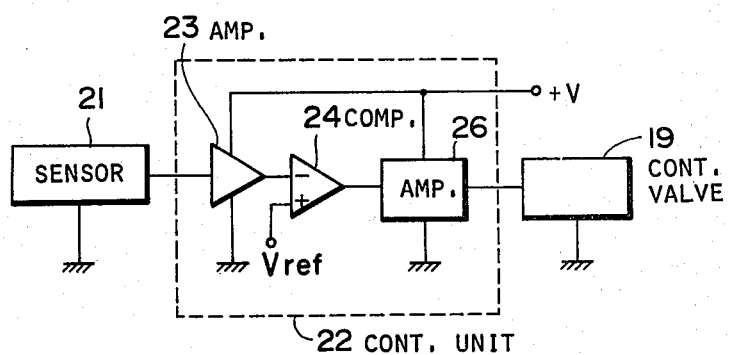
FIG. 9 is a block diagram of a control unit according to a fifth embodiment of this invention.

FIG. 9 shows an essential portion of a fuel supply apparatus according to a fifth embodiment of this invention. This apparatus is designed in a manner similar to that of the third embodiment except for the specific arrangement of the control unit 22.

The control unit 22 includes a buffer amplifier 23, a comparator 24, and a power amplifier 26. The negative input terminal of the comparator 24 is connected to the output terminal of the temperature sensor 21 by way of the buffer amplifier 23 to receive the output signal of the sensor 21 which has a voltage depending on the temperature of fuel. The positive input terminal of the comparator 24 is supplied with a reference voltage $V_{ref}$. The comparator 24 compares the temperature of fuel with a preset value defined by the reference voltage $V_{ref}$, and generates a digital signal indicative of result of the comparison. The input terminal of the power amplifier 26 is connected to the output terminal of the comparator 24, and the output terminal thereof is connected to the control valve 19. The power amplifier 26 energizes and de-energizes the control valve 19 in response to results of the comparison by the comparator 26. The control valve 19 closes and opens in response to whether the control valve 19 is energized or de-energized. The grounding terminals of the sensor 21 the amplifiers 23 and 26, the comparator 24, and the control valve 19 are grounded. The power supplied terminals of the amplifiers 23 and 26, and the comparator 24 are supplied with a constant voltage $+V$.

When the temperature of fuel is equal to or greater than the preset value defined by the reference voltage $V_{ref}$, the control valve 19 is de-energized to block the auxiliary passage 18 (see FIG. 6). When the temperature of fuel is lower than the preset value, the control valve 19 is energized to open the auxiliary passage 18.

It should be understood that further modifications and variations may be made in this invention without departing from the spirit and scope of this invention as set forth in the appended claims.

What is claimed is:

1. A fuel supply apparatus for a diesel engine, comprising:
   (a) a fuel tank;
   (b) a fuel injection pump having an inlet and an overflow outlet;
   (c) a fuel feed line connecting the fuel tank to the inlet of the fuel injection pump;
   (d) a fuel feed pump disposed in the fuel feed line to supply fuel from the fuel tank to the fuel injection pump;
   (e) a fuel filter disposed along the fuel feed line;
   (f) a main fuel return line connecting the overflow outlet of the fuel injection pump to the fuel tank;
   (g) an auxiliary fuel return line connecting the overflow outlet of the fuel injection pump to the fuel feed line at a position upstream of the fuel filter;
   (h) a control valve disposed in the auxiliary fuel return line to selectively block the latter; and
   (i) means for driving the control valve in response to the temperature of fuel in the fuel filter so that the control valve will block the auxiliary fuel return line only when the temperature of fuel in the fuel filter is higher than a preset value;
   (j) the fuel filter comprising a housing formed with a chamber connected along the fuel feed line and the auxiliary fuel return line, the driving means being disposed in the chamber to respond to the temperature of fuel in the chamber; and
   (k) means for diverting the fuel from the auxiliary fuel return line away from the driving means when the control valve opens the auxiliary fuel return line so that the driving means does not respond solely to the temperature of fuel from the auxiliary fuel return line.

2. A fuel supply apparatus as recited in claim 1, wherein the filter housing includes a stepped port connected along the auxiliary fuel return line, wherein the control valve includes a valve body slideably disposed in the port and having a conical end opposing the step of the port, the conical end of the valve body being able to contact the inner edge of the step of the port to block the auxiliary fuel return line, the valve body engaging the driving means, and wherein the diverting means includes a passage formed in the filter housing, one end of the passage being connected to the port downstream of the step thereof and the other end of the passage opening to the chamber distant from the driving means.

3. A fuel supply apparatus as recited in claim 2, wherein the driving means includes a bimetallic strip having a fixed end and a free end which engages the end of the valve body opposite to the conical end thereof.

4. A fuel supply apparatus as recited in claim 1 wherein the fuel filter is located at a position upstream of the fuel feed pump.

5. A fuel supply apparatus as recited in claim 1 wherein the driving means includes a sensor sensing the temperature of fuel in the fuel filter and generating a signal indicative thereof, means for comparing the signal from the sensor with a reference signal and generating a signal indicative of result of the comparison, and means for activating the control valve in response to the signal from the comparing means.

6. A fuel supply apparatus for a diesel engine comprising:
(a) a fuel tank;
(b) a fuel injection pump having an inlet and an overflow outlet;
(c) a fuel feed line connecting the fuel tank to the inlet of the fuel injection pump;
(d) a fuel feed pump disposed in the fuel feed line to supply fuel from the fuel tank to the fuel injection pump;
(e) a fuel filter disposed along the fuel feed line;
(f) a main fuel return line connecting the overflow outlet of the fuel injection pump to the fuel tank;
(g) an auxiliary fuel return line connecting the overflow outlet of the fuel injection pump to the fuel feed line at a position upstream of the fuel filter;
(h) a control valve disposed in the auxiliary fuel return line to selectively block the latter;
(i) temperature sensing means for sensing fuel temperature in the fuel filter; and
(j) means for driving the control valve in response to the temperature of the fuel so that the control valve will block the auxiliary fuel return line only when the sensed temperature of the fuel is higher than a preset value and so that the control valve will permit fuel to return to said fuel tank and to said fuel feed line when said temperature is lower than said preset value;
wherein said means for driving the control valve is responsive to said fuel temperature for selectively blocking the auxiliary fuel line.

7. A fuel supply apparatus for a diesel engine comprising:
(a) a fuel tank;
(b) a fuel injection pump having an inlet and an overflow outlet;
(c) a fuel feed line connecting the fuel tank to the inlet of the fuel injection pump;
(d) a fuel feed pump disposed in the fuel feed line to supply fuel from the fuel tank to the fuel injection pump;
(e) a fuel filter disposed along the fuel feed line;
(f) a main fuel return line connecting the overflow outlet of the fuel injection pump to the fuel tank;
(g) an auxiliary fuel return line connecting the overflow outlet of the fuel injection pump to the fuel feed line at a position upstream of the fuel filter;
(h) a control valve disposed in the auxiliary fuel return line to selectively block the latter; and
(i) means for driving the control valve in response to the temperature of the fuel so that the control valve will block the auxiliary fuel return line only when the sensed temperature of the fuel is higher than a preset value and so that the control valve will permit fuel to return to said fuel tank and to said fuel feed line when said temperature is lower than said preset value,
said means for driving the control valve comprises microcomputer means operable for reading a value of fuel temperature from a temperature sensor, for determining whether the value of temperature is equal to or higher than preset value therefor, and for providing a control signal to said control valve for driving said control valve to block said auxiliary fuel return line when said temperature value exceeds said preset value and for sending to said control valve a control signal to open said axuiliary fuel return line when said temperature value is lower than said preset value.

* * * * *